United States Patent
Zheng et al.

(10) Patent No.: US 12,228,244 B2
(45) Date of Patent: Feb. 18, 2025

(54) MECHANICAL APPARATUS LEVELLING MECHANISM AND LEVELLING METHOD THEREFOR

(71) Applicants: Mettler-Toledo (Changzhou) Measurement Technology Ltd., Changzhou (CN); Mettler-Toledo (Changzhou) Precision Instruments Ltd., Changzhou (CN); Mettler-Toledo International Trading (Shanghai) Co., Ltd., Shanghai (CN)

(72) Inventors: Shaowen Zheng, Changzhou (CN); Dengyou Chen, Changzhou (CN); Huaqiang Hui, Changzhou (CN); Gang Wu, Changzhou (CN); Qingsong Zhao, Changzhou (CN); Long Qian, Changzhou (CN); Pengbo Hao, Changzhou (CN)

(73) Assignees: Mettler-Toledo (Changzhou) Measurement Technology Ltd., Changzhou (CN); Mettler-Toledo (Changzhou) Precision Instruments Ltd., Changzhou (CN); Mettler Toledo International Trading (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/913,900

(22) PCT Filed: Mar. 24, 2021

(86) PCT No.: PCT/CN2021/082573
§ 371 (c)(1),
(2) Date: Sep. 23, 2022

(87) PCT Pub. No.: WO2021/190535
PCT Pub. Date: Sep. 30, 2021

(65) Prior Publication Data
US 2024/0110660 A1 Apr. 4, 2024

(30) Foreign Application Priority Data

Mar. 24, 2020 (CN) .......................... 202010213453.8

(51) Int. Cl.
F16M 7/00 (2006.01)
F16M 5/00 (2006.01)
G01G 21/28 (2006.01)

(52) U.S. Cl.
CPC ................ *F16M 7/00* (2013.01); *F16M 5/00* (2013.01); *G01G 21/28* (2013.01)

(58) Field of Classification Search
CPC ........... F16M 7/00; F16M 5/00; A47B 91/024
See application file for complete search history.

(56) References Cited

U.S. PATENT DOCUMENTS 239,556 A * 3/1881 Sabin ................... A47B 91/024
248/188.4
640,960 A * 1/1900 Seely ................... A47B 91/024
248/188.4

(Continued)

FOREIGN PATENT DOCUMENTS

CN 2873415 Y 2/2007
CN 201465573 U 5/2010

(Continued)

*Primary Examiner* — Eret C McNichols
(74) *Attorney, Agent, or Firm* — Standley Law Group LLP; Jeffrey S. Standley; Adam J. Smith

(57) ABSTRACT

A mechanical apparatus levelling mechanism has a base (10), an adjusting screw rod (20), an adjusting plate (30) and a support plate (40). The adjusting screw rod penetrates into the adjusting plate in an axial direction and is connected to the base. The adjusting plate is located on the base; the support plate is mounted at a top end of the adjusting screw rod and is located above the adjusting plate; and the adjusting plate rotates to drive the adjusting screw rod to rotate, such that the support plate is adjusted vertically. This (Continued)

simplifies the operation procedure, improving the assembly accuracy and improving the working efficiency. The method is simple to operate. These adjusting mechanisms are convenient to move and simple to adjust, are time-saving and labour-saving, and have adjustment dimensions that can be quantified. Moreover, the installation is simple, and the adjusting mechanisms themselves can be reused.

17 Claims, 8 Drawing Sheets

(56) References Cited

U.S. PATENT DOCUMENTS

| | | | | | |
|---|---|---|---|---|---|
| 842,641 | A | * | 1/1907 | Fernau | A47B 91/024 248/188.4 |
| 4,632,356 | A | * | 12/1986 | Munz | F16F 1/3615 248/188.4 |
| 5,000,416 | A | | 3/1991 | Fantasia | |
| 5,988,574 | A | * | 11/1999 | Podgorski | A47B 91/06 248/346.11 |
| 6,902,140 | B1 | * | 6/2005 | Huang | F16M 7/00 248/188.4 |
| 9,027,898 | B1 | * | 5/2015 | Holmboe | E04G 25/065 248/354.4 |
| 9,416,483 | B1 | * | 8/2016 | Freakes | F16M 7/00 |
| 10,976,192 | B2 | * | 4/2021 | Graf | G01G 21/28 |
| 2006/0192069 | A1 | * | 8/2006 | Attaway | F16M 7/00 248/351 |
| 2007/0023591 | A1 | * | 2/2007 | Kwon | D06F 39/125 248/188.3 |
| 2009/0211058 | A1 | * | 8/2009 | Nagayama | F16B 23/00 248/188.4 |
| 2020/0347540 | A1 | * | 11/2020 | Zhao | F16M 7/00 |

FOREIGN PATENT DOCUMENTS

| | | | |
|---|---|---|---|
| CN | 106499916 | A | 3/2017 |
| CN | 108612965 | A | 10/2018 |
| CN | 209557900 | U * | 10/2019 |
| CN | 212156293 | U | 12/2020 |
| KR | 10-2019-0061404 | A | 6/2019 |

* cited by examiner

MECHANICAL APPARATUS LEVELLING MECHANISM AND LEVELLING METHOD THEREFOR

BACKGROUND OF THE INVENTION

Technical Field

The present invention relates to the field of mechanical apparatus levelling, and in particular to a mechanical apparatus levelling mechanism and a levelling method therefor.

Background Art

In the field of mechanical apparatus levelling, especially in conditions that are inconvenient for levelling, such as an occasion where a mechanical apparatus is installed in a foundation pit, where it is inconvenient to adjust, or an occasion where a mechanical apparatus is placed in water or an oil medium, where it is impossible or inconvenient for a person to access the medium and perform levelling; or in a chemically polluted environment or in a hazardous environment such as a space exposed to electromagnetic radiation, a levelling apparatus is imperative to meet the levelling requirements.

When a platform scale or other weighing apparatuses, but not limited to weighing apparatuses, is installed in a foundation pit, the apparatus needs to be adjusted to a good level condition to ensure that the mechanical apparatus works under installation conditions that meet the design requirements.

For example, a platform scale or a truck scale needs to be well levelled when being installed in a foundation pit. However, since the gap between the scale body (weighing platform) or a mechanical member itself and a foundation is very small, when the platform scale is placed in a foundation pit or a foundation, it is inconvenient or impossible to adjust its level accurately. It is necessary to repeatedly remove the scale body (weighing platform) and other mechanical members outside the foundation pit or the foundation, and the design and installation requirements can be satisfied only after multiple adjustments. Since the weighing apparatus itself is relatively heavy and needs to be lifted by means of a forklift or other such lifting apparatuses, it is time-consuming and labour-intensive in operation and is very inconvenient to install.

In view of this, those skilled in the art would have improved a mechanical apparatus levelling mechanism in order to overcome the foregoing technical problem.

SUMMARY

The technical problem to be solved by the present invention is to overcome the disadvantages, such as time-consuming and laborious operation, very inconvenient installation, and difficult levelling, of the mechanical apparatus levelling mechanism in the prior art, and provide a mechanical apparatus levelling mechanism and a levelling method therefor.

The present invention solves the above technical problem through the following technical solution, in which: a mechanical apparatus levelling mechanism, characterized by comprising a base, an adjusting screw rod, an adjusting plate and a support plate, wherein the adjusting screw rod is penetrable into the adjusting plate in an axial direction and the adjusting screw rod is connectable to the base; the adjusting plate is located on the base; the support plate is mountable at a top end of the adjusting screw rod and is locatable above the adjusting plate; and the adjusting plate is rotatable to drive the adjusting screw rod, such that the support plate is adjustable vertically.

According to an embodiment of the present invention, the adjusting screw rod is fixedly connectable to the adjusting plate.

According to an embodiment of the present invention, the adjusting plate comprising an adjusting handle provided at an outside portion, and the adjusting plate is rotatable by the adjusting handle.

According to an embodiment of the present invention, the adjusting plate comprises a plurality of holes perpendicular to an axial direction and provided at periphery of the adjusting plate, and the adjusting handle is mountable in at least one of the holes.

According to an embodiment of the present invention, the mechanical apparatus levelling mechanism further comprises an anti-rollover device, wherein the anti-rollover device is arranged at a bottom end face of the support plate, and an upper end portion of the adjusting screw rod is penetrable into the anti-rollover device, such that a top end face of the adjusting screw rod and a bottom end face of the support plate come into contact with each other.

According to an embodiment of the present invention, the top end face of the adjusting screw rod and the bottom end face of the support plate come into contact with each other through a ball contact or an arc contact.

According to an embodiment of the present invention, the anti-rollover device is internally provided with an accommodation cavity, and the upper end portion of the adjusting screw rod is received in to the accommodation cavity.

According to an embodiment of the present invention, the upper end portion of the adjusting screw rod is sheathed with an O-ring.

The present invention further provides a mechanical apparatus levelling method, characterized in that the mechanical apparatus levelling method uses the mechanical apparatus levelling mechanism mentioned above, the mechanical apparatus levelling method comprising the following steps:

S1, placing a mechanical levelling mechanism into an apparatus installation plane inside a foundation or a foundation pit, and adjusting the structure to a zero position;

S2, placing a mechanical apparatus in position on the mechanical apparatus levelling mechanism;

S3, inserting an adjusting handle in to the adjusting plate for adjusting multiple vertices of the mechanical apparatus to suitable heights, and recording the corresponding height difference;

S4, marking the corresponding positional relationship between the mechanical apparatus and the foundation or the foundation pit so as to ensure that after the mechanical apparatus levelling mechanism is removed, the mechanical apparatus when in position is at the same position as the previous position;

S5, removing the mechanical apparatus, and removing the mechanical apparatus levelling mechanism; and S6, placing the mechanical apparatus into the foundation or the foundation pit at the previously marked position.

According to an embodiment of the present invention, prior to the step S1, further comprising: providing the foundation or the foundation pit where the mechanical apparatus is mounted.

According to an embodiment of the present invention, the step S5 specifically comprises: providing a corresponding thickness compensation gasket on the foundation or the foundation pit.

The positive improvement effects of the present invention are as follows: the mechanical apparatus levelling mechanism and the levelling method therefor according to the present invention can achieve the purposes of simplifying the operation procedure, improving the assembly accuracy, and improving the working efficiency. The method is simple to operate. These adjusting mechanisms are convenient to move and simple to adjust, saving labour and time, and have adjustable dimensions that can be quantified. Moreover, the installation is simple, and the adjusting mechanism can be used repeatedly.

BRIEF DESCRIPTION OF THE DRAWINGS

The above and other features, properties and advantages of the present invention will become clearer based on the description below in conjunction with the accompanying drawings and embodiments, and the same features are always indicated by the same reference numerals in the figures, in which.

DETAILED DESCRIPTION OF EMBODIMENTS

Figure 1:
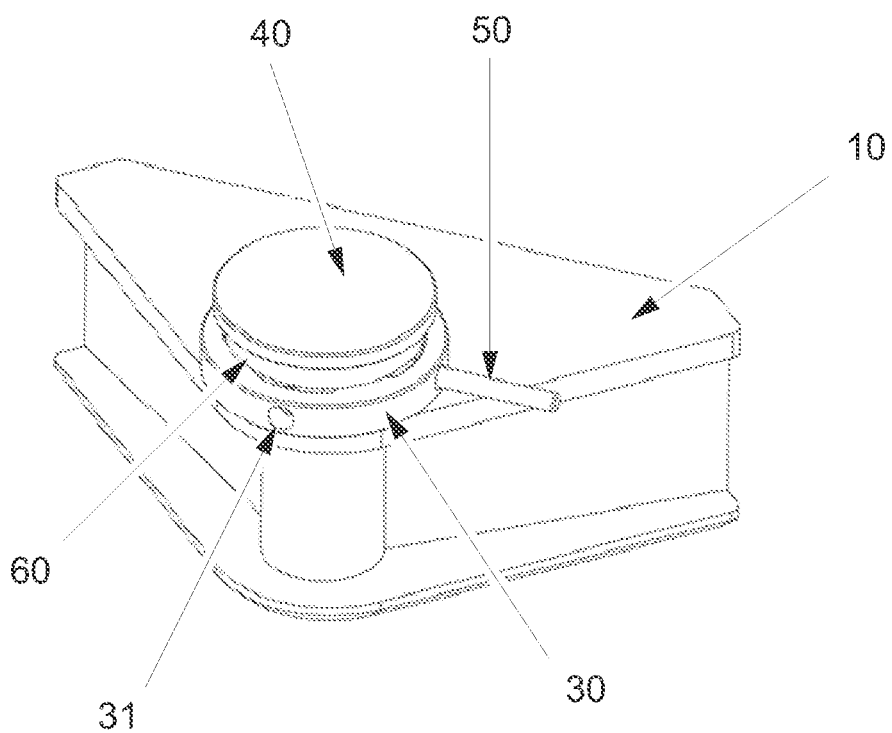
FIG. 1 is a perspective view of a mechanical apparatus levelling mechanism of the present invention.

To make the above objects, features and advantages of the present invention more apparent and easier to understand, specific implementations of the present invention are described in detail below with reference to the accompanying drawings.

Embodiments of the present invention will now be described in detail with reference to the accompanying drawings. Reference will now be made in detail to preferred embodiments of the present invention, examples of which are illustrated in the accompanying drawings. The same reference numerals used in all the accompanying drawings denote identical or similar parts wherever possible.

Furthermore, although the terms used in the present invention are selected from well-known common terms, some of the terms mentioned in the description of the present invention may have been selected by the applicant according to his or her determination, and the detailed meaning thereof is described in the relevant section described herein.

Furthermore, the present invention must be understood, not simply by the actual terms used but also by the meanings encompassed by each term.

Figure 2:
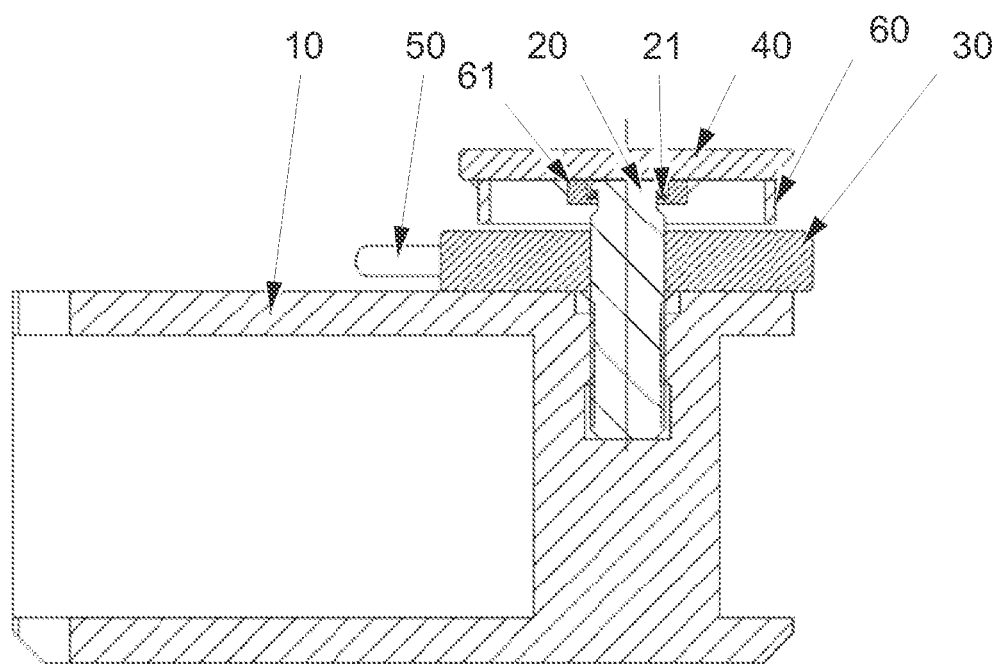
FIG. 2 is a structural schematic diagram of the mechanical apparatus levelling mechanism of the present invention.

FIG. 1 is a perspective view of a mechanical apparatus levelling mechanism of the present invention. FIG. 2 is a structural schematic diagram of the mechanical apparatus levelling mechanism of the present invention.

As shown in FIGS. 1 and 2, the present invention discloses a mechanical apparatus levelling mechanism, comprising a base 10, an adjusting screw rod 20, an adjusting plate 30 and a support plate 40, wherein the adjusting screw rod 20 penetrates into the adjusting plate 30 in an axial direction and is connected to the base 10; the adjusting plate 30 is located on the base 10; the support plate 40 is mounted at a top end of the adjusting screw rod 20 and is located above the adjusting plate 30; and the adjusting plate 30 rotates to drive the adjusting screw rod 20 to rotate, such that the support plate 40 is adjusted vertically.

Preferably, the adjusting screw rod 20 is fixedly connected to the adjusting plate 30 so as to form a tight connection therebetween. An adjusting handle 50 is provided at an outside portion of the adjusting plate 30, and the adjusting plate 30 is driven by the adjusting handle 50 to rotate.

In particular, a plurality of holes 31 perpendicular to the axial direction are provided at the periphery of the adjusting plate 30 here, and the adjusting handle 50 is mounted in any one of the holes 31 to realize the function of driving the adjusting plate 30. Here, four or more holes 31 are provided for, during adjustment, insertion of the insert adjusting handle 50 or other tools for extending the moment arm.

Further, the mechanical apparatus levelling mechanism further comprises an anti-rollover device 60, wherein the anti-rollover device 60 is arranged at a bottom end face of the support plate 40, and an upper end portion of the adjusting screw rod 20 penetrates into the anti-rollover device 60, such that a top end face of the adjusting screw rod 20 and a bottom end face of the support plate 40 come into contact with each other.

In particular, the contact between the top end face of the adjusting screw rod 20 and the bottom end face of the support plate 40 is preferably a ball contact or an arc contact. Such a structural configuration can eliminate the error caused due to flatness between the support plate 40 and the bottom plane of the mechanical apparatus 80. The anti-rollover device 60 can ensure to avoid the occurrence of rollover of a mechanical apparatus 80 during the placement thereof in position, caused by the off-centering of the apparatus due to the tilting of the mechanical apparatus 80 itself during the placement thereof in position.

In addition, the anti-rollover device 60 is internally provided with an accommodation cavity 61, and the upper end portion of the adjusting screw rod 20 is provided in the accommodation cavity 61 in a penetrating manner. The upper end portion of the adjusting screw rod 20 is sheathed with an O-ring 21. The O-ring 21 is provided to ensure that the adjusting screw rod 20 is fully centered during use, with a side surface thereof being not in contact with other metal parts, otherwise causing excessive friction and making adjustment difficult.

When the mechanical apparatus levelling mechanism is in an initial state, a lower end face of the adjusting plate 30 and an upper end face of the base 10 are attached to each other so as to achieve full contact therebetween, with theoretical gap being zero. When adjustment is started, the adjusting plate 30 moves upward, and after the adjusting plate 30 is adjusted in position, the distance between the adjusting plate and the upper end face of the base 10, i.e., the adjustment gap between the mechanical apparatus 80 and the foundation or the foundation pit 70. Here, during adjustment, it is necessary to ensure that the mechanical apparatus 80 has been placed on the mechanical apparatus levelling mechanism.

Figure 3:
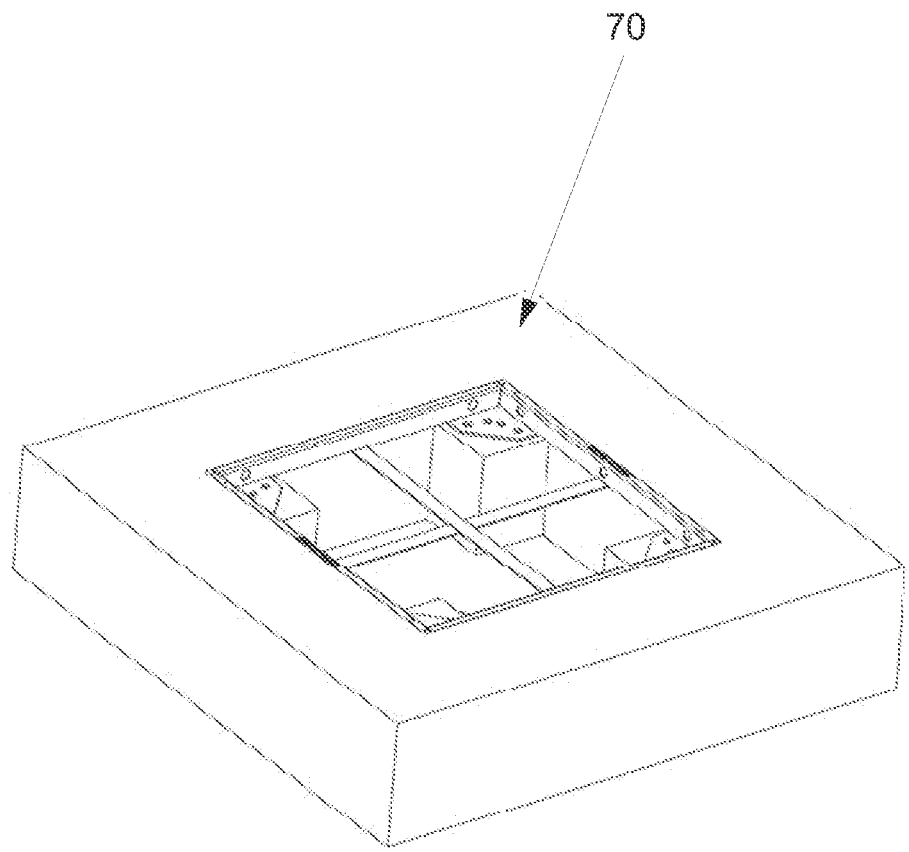
FIG. 3 is a structural schematic diagram of a foundation or a foundation pit in the mechanical apparatus levelling method of the present invention.
Figure 4:
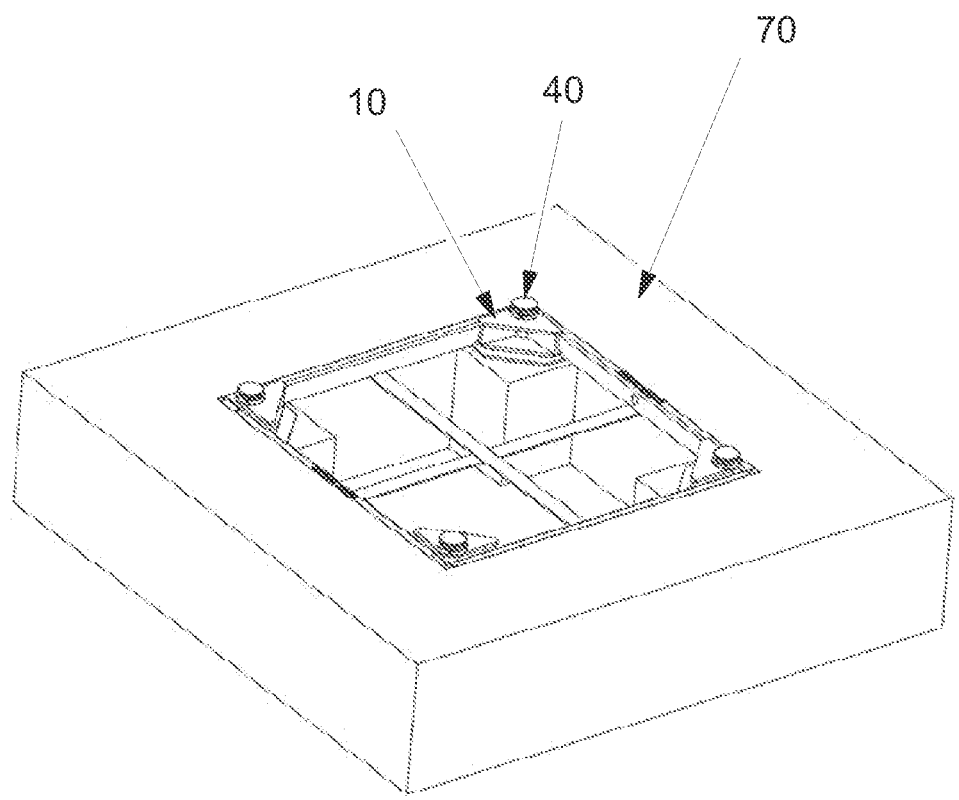
FIG. 4 is a schematic diagram of step S1 in the mechanical apparatus levelling method of the present invention.
Figure 5:
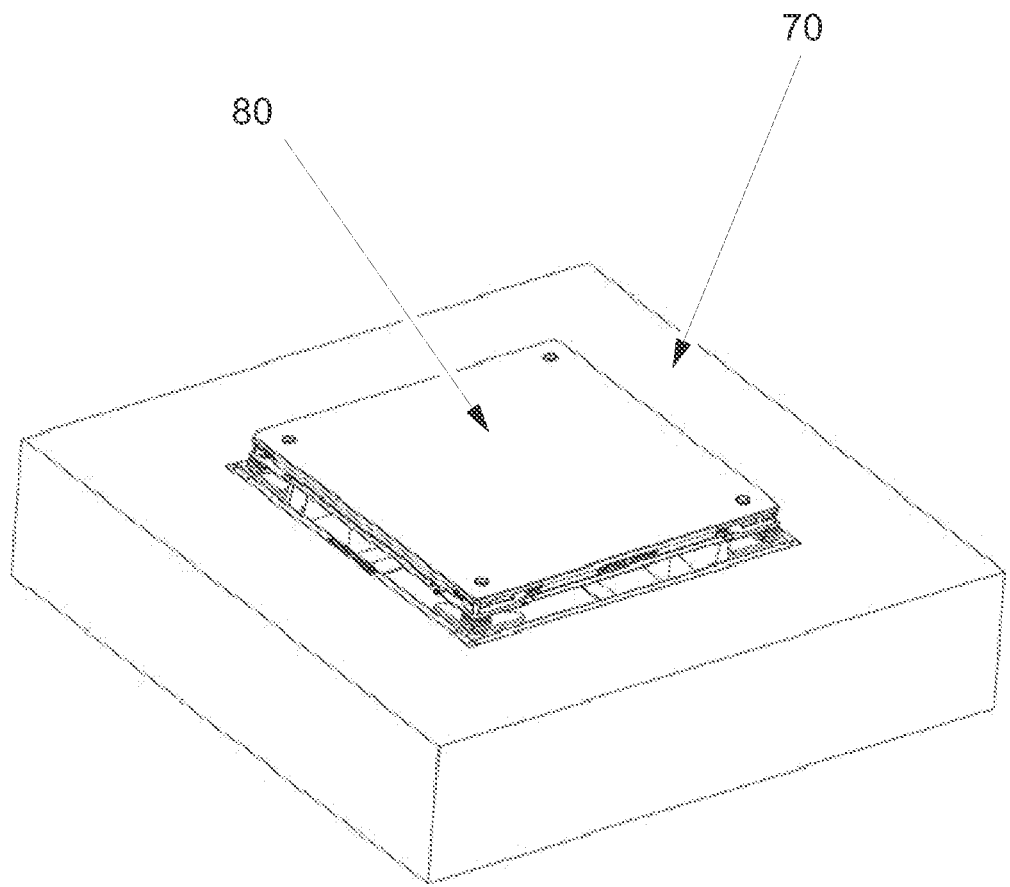
FIG. 5 is a schematic diagram of step S2 in the mechanical apparatus levelling method of the present invention.
Figure 6:
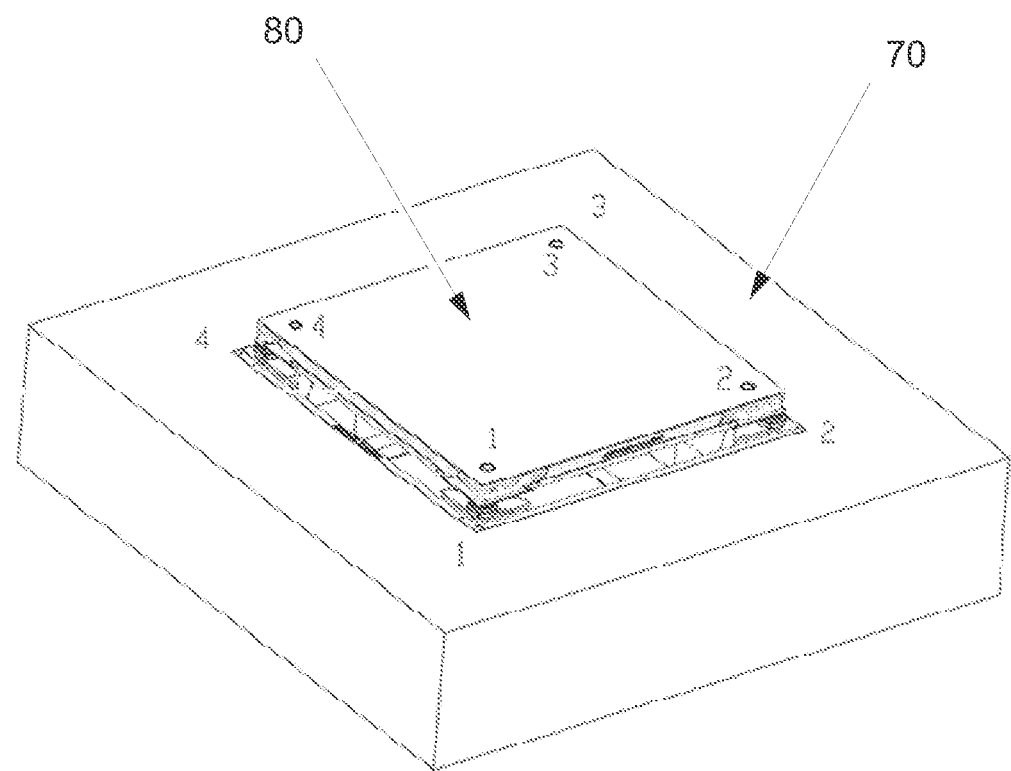
FIG. 6 is a schematic diagram of step S3 in the mechanical apparatus levelling method of the present invention.
Figure 7:
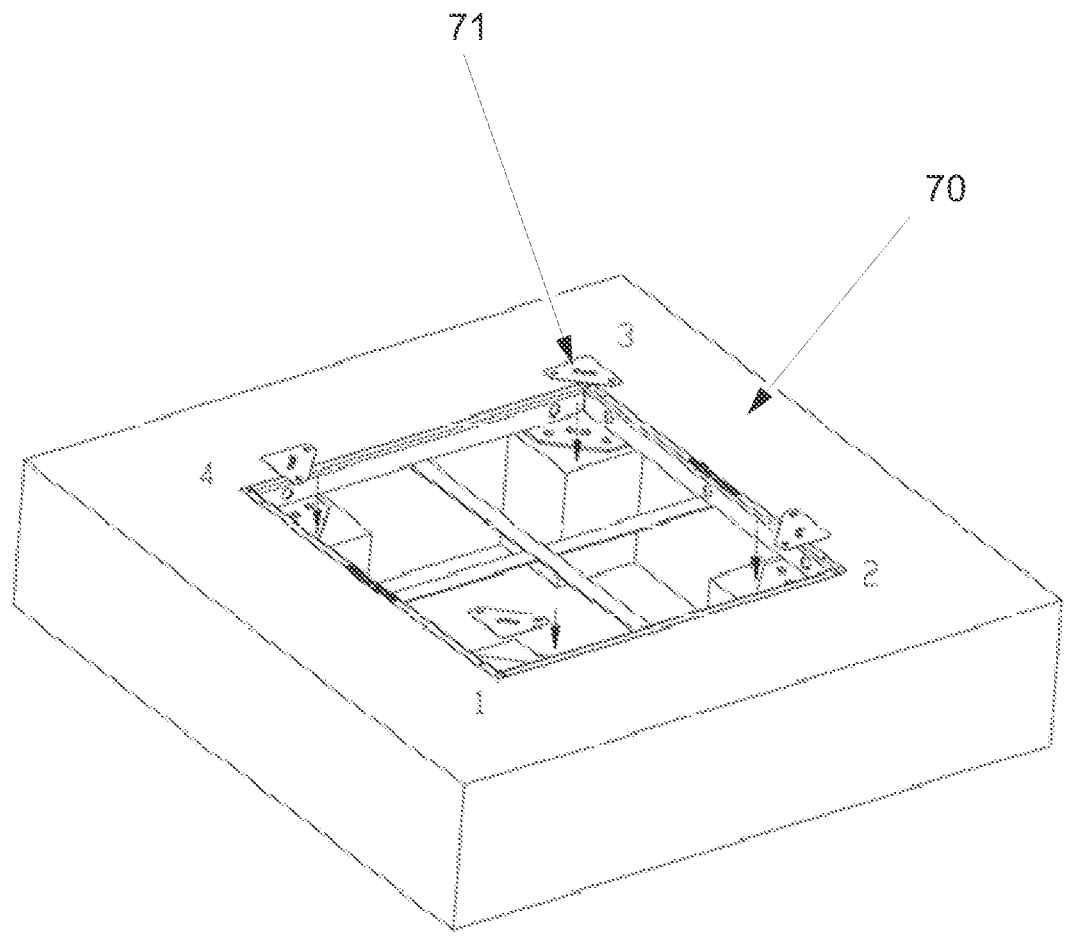
FIG. 7 is a schematic diagram of step S5 in the mechanical apparatus levelling method of the present invention.
Figure 8:
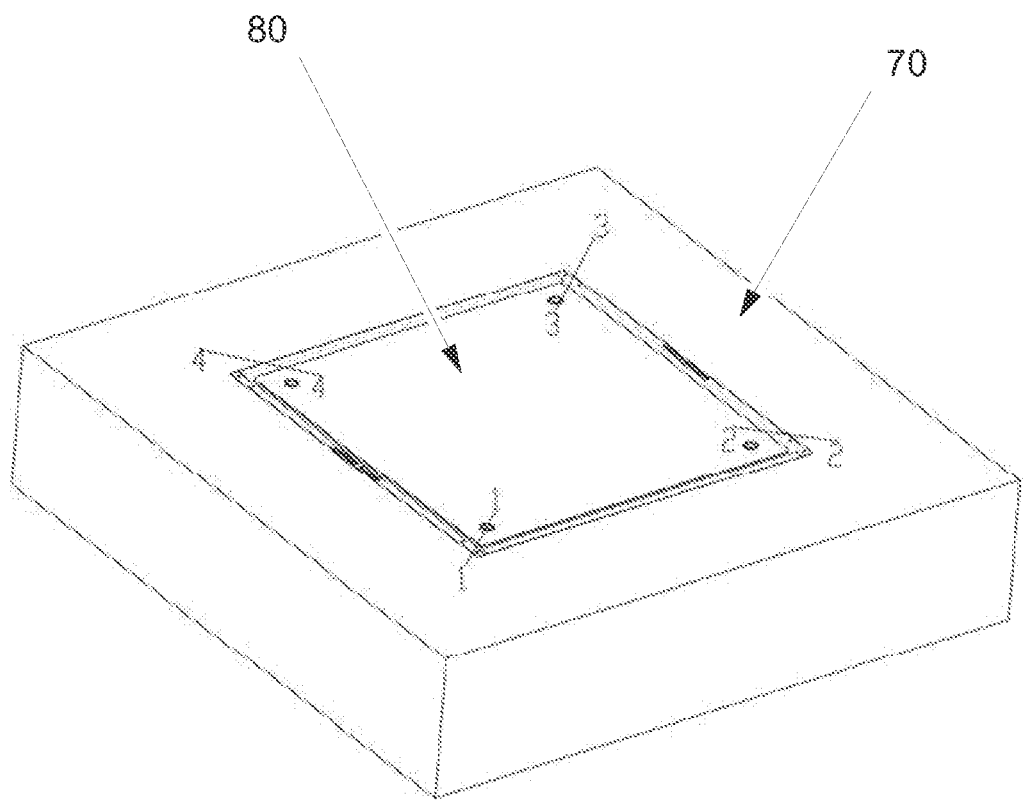
FIG. 8 is a schematic diagram of step S6 in the mechanical apparatus levelling method of the present invention.

FIG. 3 is a structural schematic diagram of a foundation or a foundation pit 70 in the mechanical apparatus levelling method of the present invention. FIG. 4 is a schematic diagram of step S1 in the mechanical apparatus levelling method of the present invention. FIG. 5 is a schematic diagram of step S2 in the mechanical apparatus levelling method of the present invention. FIG. 6 is a schematic diagram of step S3 in the mechanical apparatus levelling method of the present invention. FIG. 7 is a schematic diagram of step S5 in the mechanical apparatus levelling method of the present invention. FIG. 8 is a schematic diagram of step S6 in the mechanical apparatus levelling method of the present invention.

As shown in FIGS. 3 to 8, the present invention further provides a mechanical apparatus levelling method using the mechanical apparatus levelling mechanism mentioned above, the mechanical apparatus levelling method comprising the following steps.

In step S1, a mechanical levelling mechanism is placed into an apparatus installation plane inside a foundation or a foundation pit 70, and the structure is adjusted to a zero position. The zero position means the gap between the adjusting plate 30 and the base 10 is zero.

Prior to the step S1, it is necessary to provide the foundation or the foundation pit 70 where the mechanical apparatus 80 is installed (as shown in FIG. 3).

In S2, a mechanical apparatus 80 is placed in position on the mechanical apparatus levelling mechanism.

In S3, an adjusting handle 50 is inserted to adjust multiple vertexes of the mechanical apparatus 80 to suitable heights, and the corresponding height difference is recorded.

In S4, the corresponding positional relationship between the mechanical apparatus 80 and the foundation or the foundation pit 70 is marked so as to ensure that after the mechanical apparatus levelling mechanism is removed, position of the mechanical apparatus 80 is same as its previous position.

In S5, the mechanical apparatus 80 is removed, and the mechanical apparatus levelling mechanism is removed.

A corresponding thickness compensation gasket 71 is provided on the foundation or the foundation pit 70. The thickness compensation gasket 71 can be designed in advance, or can be customized according to the size measured on site.

In S6, the mechanical apparatus 80 is placed into the foundation or the foundation pit 70 at the previously marked position.

Finally, the levelling of the mechanical apparatus is completed. Here, the mechanical apparatus 80 may preferably be a weighing apparatus, such as a platform scale, and of course, it may also be other mechanical apparatuses, all of which fall within the protection scope of the present invention.

According to the description of the above levelling method, the principle of the mechanical apparatus levelling method is: one or more levelling mechanisms are placed inside the foundation 70 on a contact surface or a contact point of the weighing platform, the scale body or other mechanical components with the ground, such that the reference installation surface of the apparatus is raised synchronously.

On this basis, the levelling structure is used to adjust the level of the apparatus to achieve the best installation effect. In addition, the height difference to be adjusted for each installation reference surface is recorded. After the levelling mechanism is removed, an adjustment gasket 71 with the corresponding height is mounted on the reference installation surface so as to compensate for the gap between the foundation and the apparatus installation reference surface.

This method can make the installation operation more convenient and rapid. The inconvenience of installation due to insufficient adjustment space and the defects of repeated lifting can be avoided. The adjustment accuracy can reach 0.01 mm to 0.02 mm, and the frequency required for apparatus levelling can be reduced from multiple times to once.

In summary, the mechanical apparatus levelling mechanism of the present invention and the levelling method thereof can achieve the purposes of simplifying the operation procedure, improving the assembly accuracy, and improving the working efficiency. The method is simple to operate, is simple and easy, and is conducive to shorten the installation time and reduce the pollution exposure duration. These adjusting mechanisms are convenient to move and simple to adjust, are time-saving and labor-saving, and have adjustable dimensions that can be quantified. Moreover, the installation is simple, and the adjusting mechanism can be repeatedly used.

Although specific implementations of the present invention have been described above, those skilled in the art should understand that these are merely examples, and the scope of protection of the present invention is defined by the appended claims. Various alterations or modifications to these implementations can be made by those skilled in the art without departing from the principle and essence of the present invention. However, these alterations and modifications all fall within the scope of protection of the present invention.

REFERENCE SIGNS LIST base 10
adjusting screw rod 20
adjusting plate 30
support plate 40
adjusting handle 50
hole 31
anti-rollover device 60
accommodation cavity 61
o-ring 21
foundation or foundation pit 70
thickness compensation gasket 71
mechanical apparatus 80

The invention claimed is:

1. A system for levelling a mechanical apparatus comprising a first mechanical apparatus levelling mechanism and a second mechanical apparatus levelling mechanism, each mechanical apparatus levelling mechanism comprising:
  a base comprising an upper end face;
  an adjusting screw rod;
  an adjusting plate;
  a support plate; and
  an anti-rollover device, arranged at a bottom end face of the support plate,
  wherein an upper end portion of the adjusting screw rod is penetrable into the anti-rollover device, such that a top end face of the adjusting screw rod and a bottom end face of the support plate come into contact with each other;
  wherein the adjusting screw rod of the first mechanical apparatus levelling mechanism penetrates the adjusting plate of the first mechanical apparatus levelling mechanism along an axial direction and the adjusting screw rod of the first mechanical apparatus levelling mechanism is connected to the base of the first mechanical apparatus levelling mechanism;

wherein the adjusting screw rod of the second mechanical apparatus levelling mechanism penetrates the adjusting plate of the second mechanical apparatus levelling mechanism along an axial direction and the adjusting screw rod of the second mechanical apparatus levelling mechanism is connected to the base of the second mechanical apparatus levelling mechanism;

wherein the support plate of the first mechanical apparatus levelling mechanism is mounted at a top end of the adjusting screw rod of the first mechanical apparatus levelling mechanism and is located above the adjusting plate of the first mechanical apparatus levelling mechanism;

wherein the support plate of the second mechanical apparatus levelling mechanism is mounted at a top end of the adjusting screw rod of the second mechanical apparatus levelling mechanism and is located above the adjusting plate of the second mechanical apparatus levelling mechanism;

wherein the first mechanical apparatus levelling mechanisms can be brought in a zero position in which the adjusting plate of the first mechanical apparatus levelling mechanism is located on the base of the first mechanical apparatus levelling mechanism, and the second mechanical apparatus levelling mechanisms can be brought in a zero position in which the adjusting plate of the second mechanical apparatus levelling mechanism is located on the base of the second mechanical apparatus levelling mechanism, wherein an extension of the first mechanical apparatus levelling mechanism in its zero position, said extension being along an axial direction given by the adjusting screw rod of the first mechanical apparatus levelling mechanism, is equal to an extension of the second mechanical apparatus levelling mechanism in its zero position, said extension being along an axial direction given by the adjusting screw rod of the second mechanical apparatus levelling mechanism;

wherein the adjusting plate is rotatable to adjust the support plate vertically.

2. The system of claim 1, wherein for each mechanical apparatus levelling mechanism:
the adjusting screw rod is fixedly connectable to the adjusting plate.

3. The system of claim 1, wherein each mechanical apparatus levelling mechanism further comprises:
an adjusting handle provided at an outside portion of the adjusting plate, such that the adjusting plate is rotatable by the adjusting handle.

4. The system of claim 3, wherein each mechanical apparatus levelling mechanism further comprises:
a plurality of holes in the adjusting plate perpendicular to the axial direction and at a periphery of the adjusting plate, wherein the adjusting handle is mountable in at least one of the holes.

5. The system of claim 1, wherein for each mechanical apparatus levelling mechanism:
the top end face of the adjusting screw rod and the bottom end face of the support plate come into contact with each other through a ball contact or an arc contact.

6. The system of claim 5, wherein, for each mechanical apparatus levelling mechanism:
the anti-rollover device is internally provided with an accommodation cavity, into which the upper end portion of the adjusting screw rod is received.

7. The system of claim 1, wherein for each mechanical apparatus levelling mechanism:
the anti-rollover device is internally provided with an accommodation cavity, into which the upper end portion of the adjusting screw rod is received.

8. The system of claim 7, wherein each mechanical apparatus levelling mechanism further comprises:
an O-ring in which the upper end portion of the adjusting screw rod is sheathed.

9. The system of claim 1, wherein, for each mechanical apparatus levelling mechanism, the adjusting plate is located on the base, and wherein the adjusting plate is rotatable to drive the adjusting screw rod, such that the support plate is adjustable vertically.

10. The system of claim 1 further comprising:
a thickness compensation gasket.

11. The system of claim 1, wherein the system comprises a weighing apparatus and is a system for levelling the weighing apparatus.

12. A method of levelling a mechanical apparatus using a levelling mechanism, where the mechanical apparatus levelling mechanism comprises:
a base comprising an upper end face;
an adjusting screw rod;
an adjusting plate; and
a support plate;
wherein the adjusting screw rod is penetrable into the adjusting plate in an axial direction and the adjusting screw rod is connectable to the base;
wherein the adjusting plate can be located on the base;
wherein the support plate is mountable at a top end of the adjusting screw rod and is locatable above the adjusting plate;
wherein the adjusting plate is rotatable to adjust the support plate vertically;
wherein the method of levelling comprises the steps of:
a. S1, placing the mechanical apparatus levelling mechanism into an apparatus installation plane inside a foundation or a foundation pit, and adjusting the mechanical apparatus levelling mechanism to a zero position;
b. S2, placing a mechanical apparatus in position on the mechanical apparatus levelling mechanism;
C. S3, inserting an adjusting handle into the adjusting plate for adjusting multiple vertices of the mechanical apparatus to suitable heights, and recording a corresponding height difference;
d. S4, marking a positional relationship between the mechanical apparatus and the foundation or the foundation pit so as to ensure that after the mechanical apparatus levelling mechanism is removed, the mechanical apparatus can be placed into the foundation or the foundation pit with the same orientation with respect to the foundation or foundation pit as during the adjustment of multiple vertices;
e. S5, removing the mechanical apparatus, and removing the mechanical apparatus levelling mechanism, and providing a thickness compensation gasket inside the foundation or the foundation pit; and
f. S6, placing the mechanical apparatus into the foundation or the foundation pit at the previously marked position.

13. The method of claim 12, further comprising, prior to the step S1:

providing the foundation or the foundation pit where the mechanical apparatus is mounted.

14. The method of claim 12, wherein the thickness compensation gasket is designed for compensating the recorded height difference.

15. The method of claim 14, wherein the thickness compensation gasket has a height that corresponds to the recorded height difference.

16. The method of claim 12, wherein the mechanical apparatus is a weighing apparatus.

17. A method of levelling a mechanical apparatus using a levelling mechanism, where the mechanical apparatus levelling mechanism comprises:
   a base comprising an upper end face;
   an adjusting screw rod;
   an adjusting plate; and
   a support plate;
   wherein the adjusting screw rod is penetrable into the adjusting plate in an axial direction and the adjusting screw rod is connectable to the base;
   wherein the adjusting plate can be located on the base;
   wherein the support plate is mountable at a top end of the adjusting screw rod and is locatable above the adjusting plate;
   wherein the adjusting plate is rotatable to adjust the support plate vertically;
   wherein the method of levelling comprises the steps of:

a. S1, placing the mechanical apparatus levelling mechanism into an apparatus installation plane inside a foundation or a foundation pit, and adjusting the mechanical apparatus levelling mechanism to a zero position;
   b. S2, placing a mechanical apparatus in position on the mechanical apparatus levelling mechanism;
   c. S3, inserting an adjusting handle into the adjusting plate for adjusting multiple vertices of the mechanical apparatus to suitable heights, and recording a corresponding height difference;
   d. S4, marking a positional relationship between the mechanical apparatus and the foundation or the foundation pit so as to ensure that after the mechanical apparatus levelling mechanism is removed, the mechanical apparatus can be placed into the foundation or the foundation pit with the same orientation with respect to the foundation or foundation pit as during the adjustment of multiple vertices;
   e. S5, removing the mechanical apparatus, and removing the mechanical apparatus levelling mechanism; and
   f. S6, placing the mechanical apparatus into the foundation or the foundation pit at the previously marked position;
   wherein the mechanical apparatus is a weighing apparatus.

* * * * *